Nov. 2, 1937.  M. GARBELL  2,097,919
SCALE
Filed June 3, 1935  2 Sheets-Sheet 1

Inventor:
May Garbell

Nov. 2, 1937.  M. GARBELL  2,097,919
SCALE
Filed June 3, 1935  2 Sheets-Sheet 2
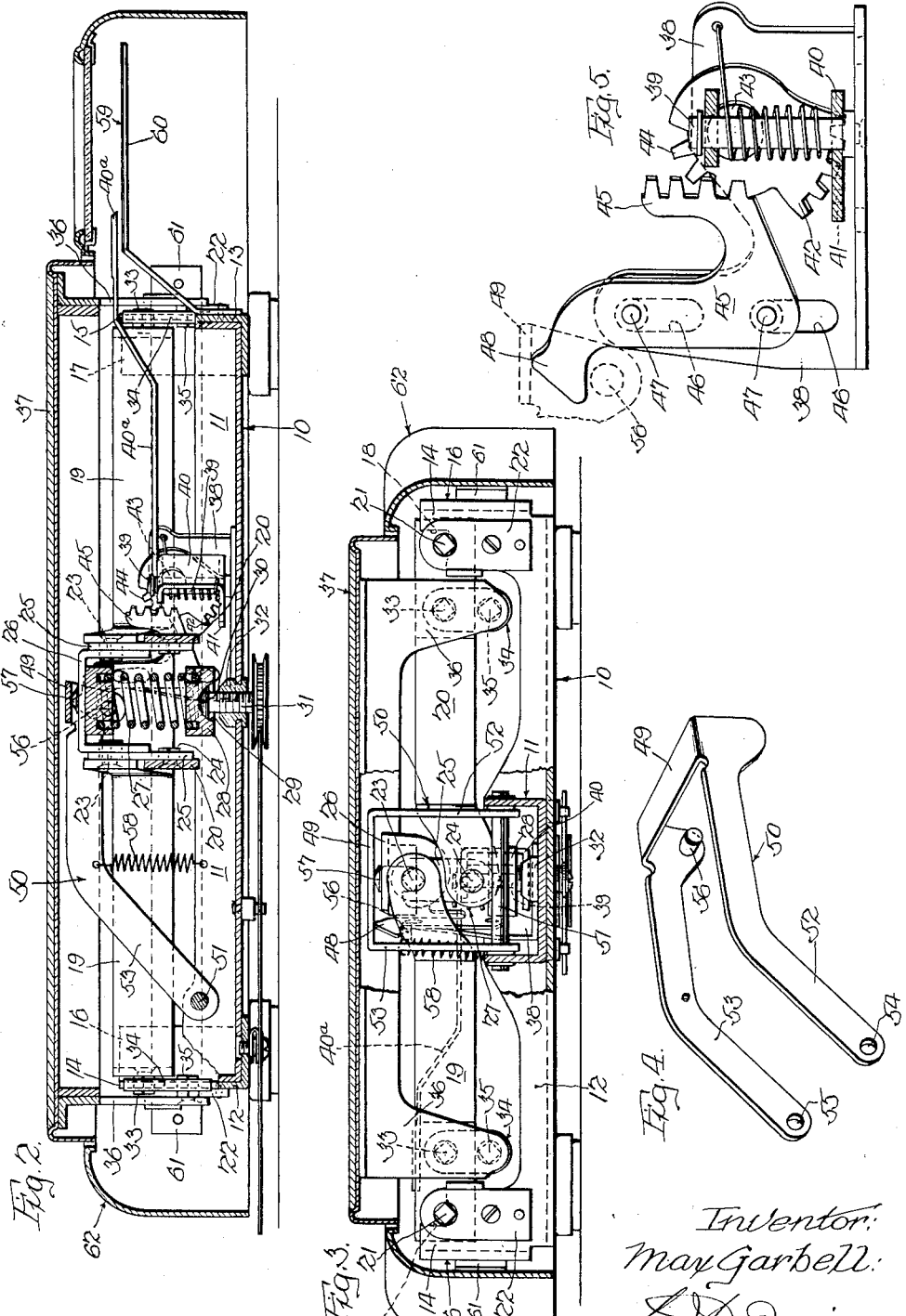

Patented Nov. 2, 1937

2,097,919

UNITED STATES PATENT OFFICE 2,097,919

SCALE

Max Garbell, Chicago, Ill., assignor to Victor Adding Machine Company, Chicago, Ill., a corporation of Delaware Application June 3, 1935, Serial No. 24,608

4 Claims. (Cl. 265—68)

This invention relates to improvements in scales and more particularly to the connecting means between the platform and the indicating mechanism.

Heretofore various constructions were employed to connect the platform of the scale with the indicating mechanism, and due to the increased movement of the indicating mechanism with respect to the movement of the platform, it was necessary that the weight be placed relatively centrally of the platform to prevent a variation in the accurate positioning of the indicating mechanism to properly record the weight. A weight placed unevenly on the platform would cause a lateral thrust or twist thereto which would increase or lessen the movement of the indicating mechanism and produce an error in the accurate functioning of the scale.

It is an object of this invention to provide means for concentrating the weight of a load placed on the platform to a common center, and to arrange the operable means of the indicating mechanism adjacent thereto and with a follower operatively connecting the two for movement with each other in one direction of movement of the platform.

Another object is the provision of a scale having a platform provided with supporting means to concentrate the weight carried on any portion of the platform to a common center to be transferred to the indicating mechanism by means of a follower member arranged to follow the movement of the supporting means to cause the movement of the indicating mechanism.

Still another object is the provision of a follower member arranged to cause a parallel and uniform movement of the operable means of the indicating mechanism with respect to the movement of the supporting means of the platform thereby causing an accurate positioning of the indicating mechanism.

And a further object is the provision of a follower member under the control of the movements of the platform supporting means for actuating the operable means of the indicating mechanism whereby the movement of the platform will cause the movement of the supporting means thereby permitting the follower to follow said supporting means to move the operable means of the indicating mechanism.

Other and further objects and advantages of the invention will become apparent from the ensuing description and claims.

Referring to the drawings:—

Figure 2 is a longitudinal sectional view taken substantially on the line 2—2 of Fig. 1.

Figure 3 is a detail cross sectional view taken substantially on the line 3—3 of Fig. 1.

Figure 4 is a detail perspective view of the follower member adapted to connect the platform supporting means with the indicating mechanism.

Figure 5 is an enlarged detail side elevation of the operable means for the indicating mechanism.

Figure 1:
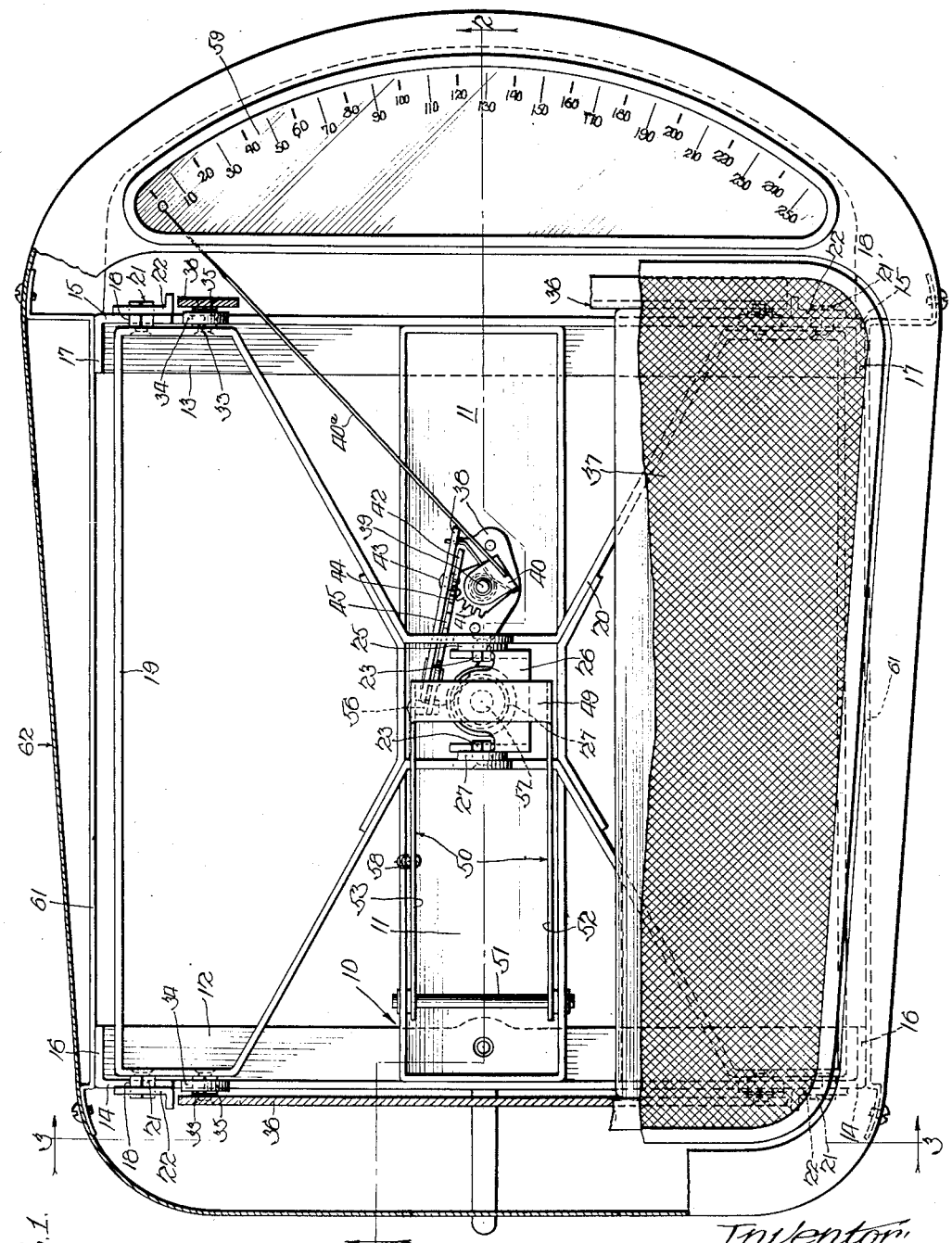
Figure 1 is a top plan view of my improved scale with a portion of the shell and platform broken away to show the interior operating mechanism.

The reference numeral 10 designates the base of the scale which is constructed in the form of an I-beam having a channel-shaped web 11 and angle-shaped flanges 12 and 13 respectively welded or otherwise secured to each end thereof. At each end of the flanges 12 and 13 are upwardly extending portions 14—14 and 15—15 respectively which are formed with an inturned flange 16—16 and 17—17 respectively. A V-shaped seat or rest 18 is provided in each of the upwardly extending portions 14—14 and 15—15 that serves as pivotal centers to support a pair of U-shaped members 19 and 20 respectively which are adapted to be carried for rocking movements between each pair of upwardly extending portions 14—15 of the flanges 12 and 13 of the base 10.

The U-shaped members 19 and 20 are each provided with outwardly directed studs 21 that are adapted to rest in the V-shaped seats 18 of the upwardly extending portions 14—15 and are retained in position thereon by means of the guide plates 22. The free ends of the U-shaped members 19 and 20 are directed toward each other and arranged in superposed relation and are provided with inwardly directed studs 23—23 and 24—24 which carry the links 25 on each pair of studs 23—24. The links 25 connect the free ends of the U-shaped members together and permit of a uniform rocking movement of one with the other.

The U-shaped members 19 and 20 are formed to converge to provide a relatively narrow space at their free end portions between which the links 25 and a saddle 26 are pivotally carried. The saddle 26 is pivotally carried on the studs 23, while the links 25 are carried on the studs 23—24 and adjacent each side of the saddle 26.

A compression spring 27 is interposed between the saddle 26 and an adjustable member 28 carried on the web 11 of the base 10. The adjustable member 28 is provided with a depression 29 into which the head 30 of a threaded member 31 extends and is threaded in a collar 32 fixed in the web 11 of the base 10. The threaded member 31 is provided with geared means that extend outwardly of the base and serve to manually adjust the adjustable member 28 and spring 27 to adjust the opposed ends of the U-shaped members 19 and 20.

Adjacent the pivotal centers 21 of the U-shaped members 19 and 20 are outwardly directed studs 33 on each of which a depending link 34 is carried which are each adapted to receive a stud 35 carried on a depending flange 36 fixed to the platform 37 of the scale.

With this construction, the platform 37 is supported on the U-shaped members 19 and 20 and the weight placed on any portion of the platform is directed through these members to the spring 27. As the pivotal centers or studs 33—35 supporting the platform are adjacent the pivotal studs 21 of the U-shaped members 19 and 20, a relatively long swinging action of these U-shaped members will be had upon a slight downward movement of the platform.

An angle bracket 38 is secured to the web 11 of the base 10 and outwardly of the spring 27 and is provided with an upwardly extending stud 39 on which a member 40 that has an indicator 40a fixed thereto is pivotally mounted. This member 40 is provided with segmental teeth 41 that are in meshing engagement with a segmental gear 42 carried on a stud 43 fixed to the vertically extending portion of the angle bracket 38. The segmental gear 42 is provided with a smaller segmental gear 44 at near its top portion which is in meshing engagement with a rack 45 slidably carried on the vertically extending portion of the bracket 38 in the guide slots 46 by means of the pins 47. The rack 45 is provided with an outwardly and upwardly extending portion 48 which is aligned transversely of the axis of the spring 27 and is adapted to be engaged by a horizontally extending cross-member 49 of a follower 50 which is pivotally carried on a shaft 51 in the web 11 of the base 10.

The follower 50 comprises a cross-member 49 having a pair of integral leg members 52 and 53, respectively, extending parallel to each other and being provided with openings 54 and 55 adjacent their free end ends through which the shaft 51 extends to pivotally carry the follower 50 on the base 10. A stud 56 is secured to the leg 53 of the follower 50 and is directed inwardly to extend under and in slightly spaced relation with the extending portion 48 of the rack 45 and serves as a guide to positively restore the rack to its normal position. The cross-member 49 of the follower 50 also engages the saddle 26 by means of a conical stud 57 fixed on its top surface and is yieldingly retained in contact therewith and with the rack 45 by means of a tension spring 58.

A dial 59 is supported on a platform 60 which is secured to the flange 13 of the base 10 and over which the indicator 40a is adapted to extend with its free end portion registering the weight placed on the platform of the scale.

The inturned flanges 16—17 of the upwardly extending portions 14—15 of the base 10 each have a strap 61 fixed thereto which is provided with an angle formation at each end thereof to which the shell or housing 62 is secured. The shell or housing is provided with a pair of openings through one of which openings the platform 37 projects and through the other of which openings the dial and indicator are visible.

In the operation of the scale, it will be noted, that as a weight is placed on the platform 37, the U-shaped members 19—20 will be caused to swing on their pivotal centers 21 and by reason of their free end portions being connected together by means of the links 25, a uniform swinging movement of the pair of U-shaped members will be had to carry the saddle therewith to compress the spring 27. This movement of the saddle 26 permits the follower 50 to swing on the shaft 51 with the cross-member 49 thereof resting on the conical stud 57 of the saddle. The tension spring 58 tends to urge the follower 50 downwardly and retains the cross-member 49 thereof against the conical stud 57 of the saddle 26 and against the extending portion 48 of the rack 45 which is connected to the indicator. The downward movement of the follower 50 causes the movement of the operable mechanism of the indicator and in this construction, the weight carried on the platform is transferred through the U-shaped members to a common center, and the movement at this point effects the movement of the indicator.

While I have shown a preferred embodiment of my invention, the same resides in the novel arrangement of parts to form an efficient and sturdy construction wherein the accurate recording of the weight placed on the platform will be maintained at all times.

I claim:

1. A scale having a base and a depressible platform carried in spaced relation therewith, platform supporting means comprising a pair of opposed members, said platform supporting means being pivotally carried on the base and having its opposed ends operatively connected together centrally of the platform, a coiled spring interposed between the base and said operative connections of the platform supporting means resisting the depressing movement of the platform, indicating means for registering the weight placed on the platform, said indicating means having operative connections extending adjacent the operative connection of the platform supporting means, and a follower having one end thereof pivotally carried on the base and with its other end adapted to overlie and engage the operative connection of the platform supporting means and indicating means, said follower forming means to depress the operative connection of the indicator to move said indicator when a load placed on the platform supporting means depresses the platform supporting means.

2. A scale having a base and a depressible platform carried in spaced relation therewith, platform supporting means pivotally connected centrally of the platform, a coiled spring interposed between said pivoted connection and the base yieldingly retaining the platform in raised position, indicating means pivotally carried on the base and having operative connections extending adjacent the pivotal connection of the platform supporting means, and spring-urged follower means pivotally carried at one end on the base and with its other end adapted to yieldingly overlie and simultaneously engage the pivotal connection of the platform supporting means and said indicating means whereby upon the depression of the platform said pivotal connection of the platform supporting means will move independently of the follower means and said follower means will be spring-urged to move the indicating means.

3. A scale comprising, a frame, an indicator, a weighing platform, and means for actuating the indicator in response to the weight placed on the platform, said means comprising platform supporting means supported on the frame and operatively connected together and to the platform, geared means operatively connected to the indicator and disposed for movement with said platform supporting means, and spring-urged follower means overlying the operative connection of the platform supporting means and the geared means of the indicator, said follower means comprising a transversely disposed member having a pair of integral spaced-apart arms pivotally secured to the frame forming means for a parallel movement whereby upon the movement of the platform supporting means said follower means will be free to be spring-urged therewith and move the geared means to move the indicator.

4. A scale comprising a base and a movable platform carried in spaced relation therewith, platform supporting means, said platform supporting means comprising a pair of opposed members having their opposed ends operatively connected together and with a spring interposed between the operative connection and base yieldingly retaining the platform in raised position, an indicator mechanism for registering the weight placed on the platform, said indicator mechanism comprising an operative connection positioned adjacent the operative connection of the platform supporting means, and follower means pivotally carried on the base and having a portion extending over and resting upon the operative connection of the platform supporting means and the operative connection of the indicator mechanism, said follower means depressing the said operative connection to move the indicator when said platform supporting means is moved upon the movement of the platform.

MAX GARBELL.